(12) United States Patent (10) Patent No.: US 7,931,190 B2
Moyer et al. (45) Date of Patent: Apr. 26, 2011

(54) CIRCUIT AND METHOD FOR CORRELATED INPUTS TO A POPULATION COUNT CIRCUIT

(75) Inventors: William C. Moyer, Dripping Springs, TX (US); Kelly K. Taylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 922 days.

(21) Appl. No.: 11/777,650

(22) Filed: Jul. 13, 2007

(65) Prior Publication Data

US 2009/0016480 A1   Jan. 15, 2009

(51) Int. Cl.
*G06C 29/00* (2006.01)
(52) U.S. Cl. .................................. 235/60 C; 708/210
(58) Field of Classification Search ............... 377/2, 39, 377/55; 708/210, 232, 620, 625, 629, 670, 708/671, 672, 708; 235/60 C, 375, 383
See application file for complete search history.

(56) References Cited

U.S. PATENT DOCUMENTS

| | | | |
|---|---|---|---|
| 5,541,865 A | 7/1996 | Ashkenazi | |
| 5,717,616 A | 2/1998 | Morris | |
| 5,734,599 A * | 3/1998 | Lee et al. | 708/620 |
| 6,430,251 B1 * | 8/2002 | Gold | 377/127 |
| 6,754,685 B2 | 6/2004 | Becker | |
| 6,795,839 B2 | 9/2004 | Karim et al. | |
| 2004/0237003 A1 * | 11/2004 | Adkisson | 714/47 |
| 2009/0019100 A1 | 1/2009 | Moyer et al. | |

OTHER PUBLICATIONS

Non-Final Office Action mailed Nov. 2, 2010 for U.S. Appl. No. 11/777,664, 12 pages.

* cited by examiner

*Primary Examiner* — Thien M Le

(57) ABSTRACT

A circuit includes a plurality of selection circuits. Each of the plurality of selection circuits has a first input, a second input, a control input, and an output. Each of the first inputs receives one of a plurality of correlated signals. Each of the second inputs receives one of a plurality of uncorrelated signals. Each of the control inputs receives a correlation mode control signal, and each of the outputs provides the one of the plurality of correlated signals or the one of the plurality of uncorrelated signals based on the correlation mode control signal. The circuit further includes a population count circuit having a plurality of data inputs coupled to receive the outputs of the plurality of selection circuits. The population count circuit provides a population count for the plurality of data inputs. The population count may be an approximate count or an accurate count.

20 Claims, 5 Drawing Sheets

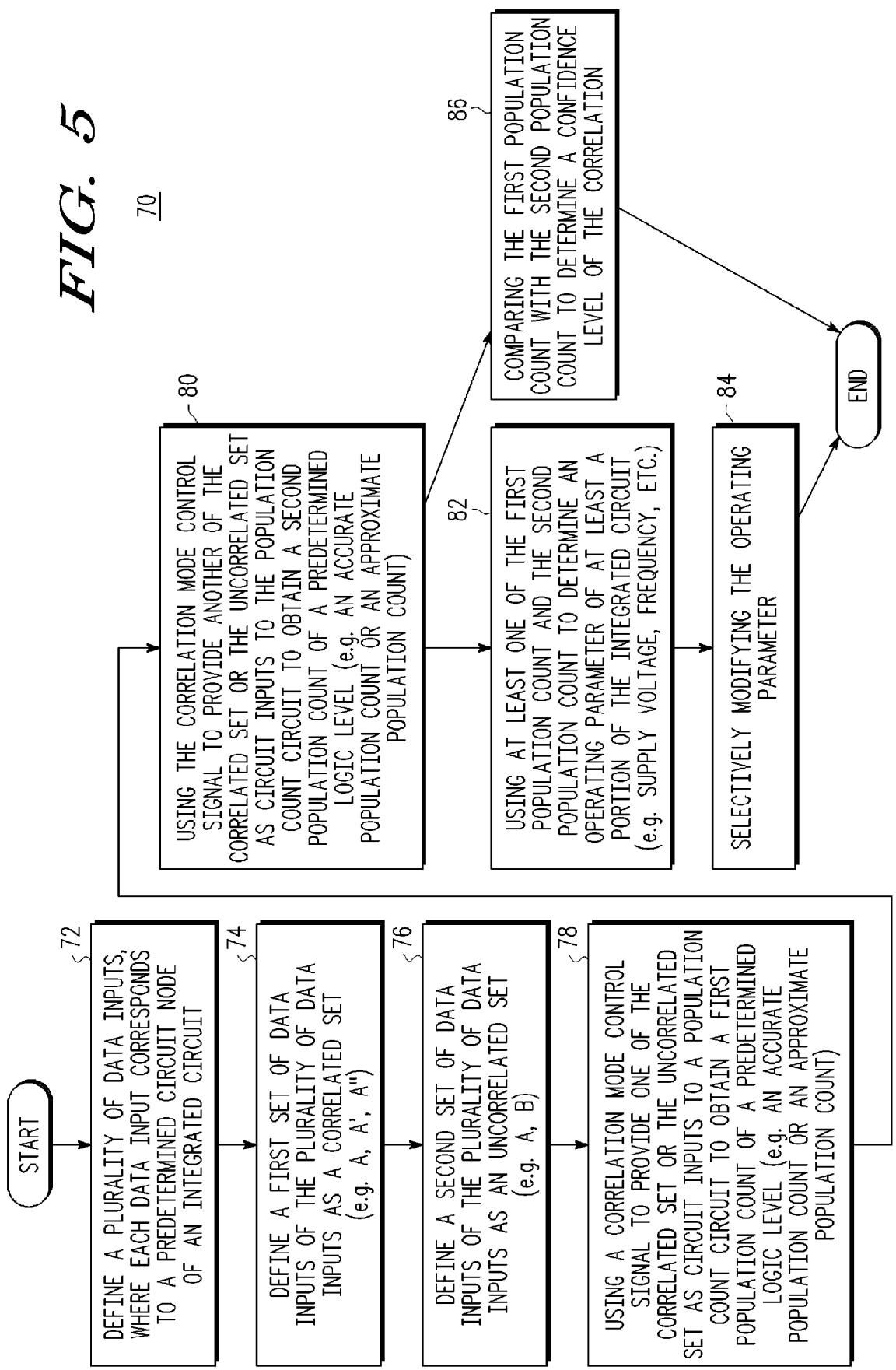

CIRCUIT AND METHOD FOR CORRELATED INPUTS TO A POPULATION COUNT CIRCUIT

RELATED APPLICATION

This application is related to our U.S. patent application Ser. No. 11/777,664 entitled "Population Count Approximation Circuit and Method Thereof" filed of even date herewith and assigned to the same assignee hereof.

BACKGROUND

1. Field

This disclosure relates generally to semiconductors, and more specifically, to semiconductor circuits that implement counting circuitry.

2. Related Art

Population count ("popcount") circuits function to output the number of logic "1" bits in data such as an input word or a vector value. For example, a population count is performed on a vector to determine the amount of nonzero elements within the vector. This function is useful for a variety of purposes including the testing or checking for failures in the expected operation of an integrated circuit, such as a communications processor or a memory. For data vectors containing a large number of bits, such as sixty-four or one hundred twenty-eight bits, the circuitry and the total delay required to perform the counting of the logic "1" bits is typically very large and inefficient. Significant time delays for a popcount operation are unacceptable in many applications such as high speed communication systems. In addition to the delay associated with known population count circuits, a large amount of circuit area is required to implement population counts of large data values. The extra circuit area results in additional costs where additional area can be afforded. In portable wireless applications, the additional area is prohibitive and thus the population count function cannot be implemented. In either situation, where a large number of sample points is required to be checked, the accumulation of a total count of bits of predetermined logic value is costly and time inefficient.

DETAILED DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

Figure 1:
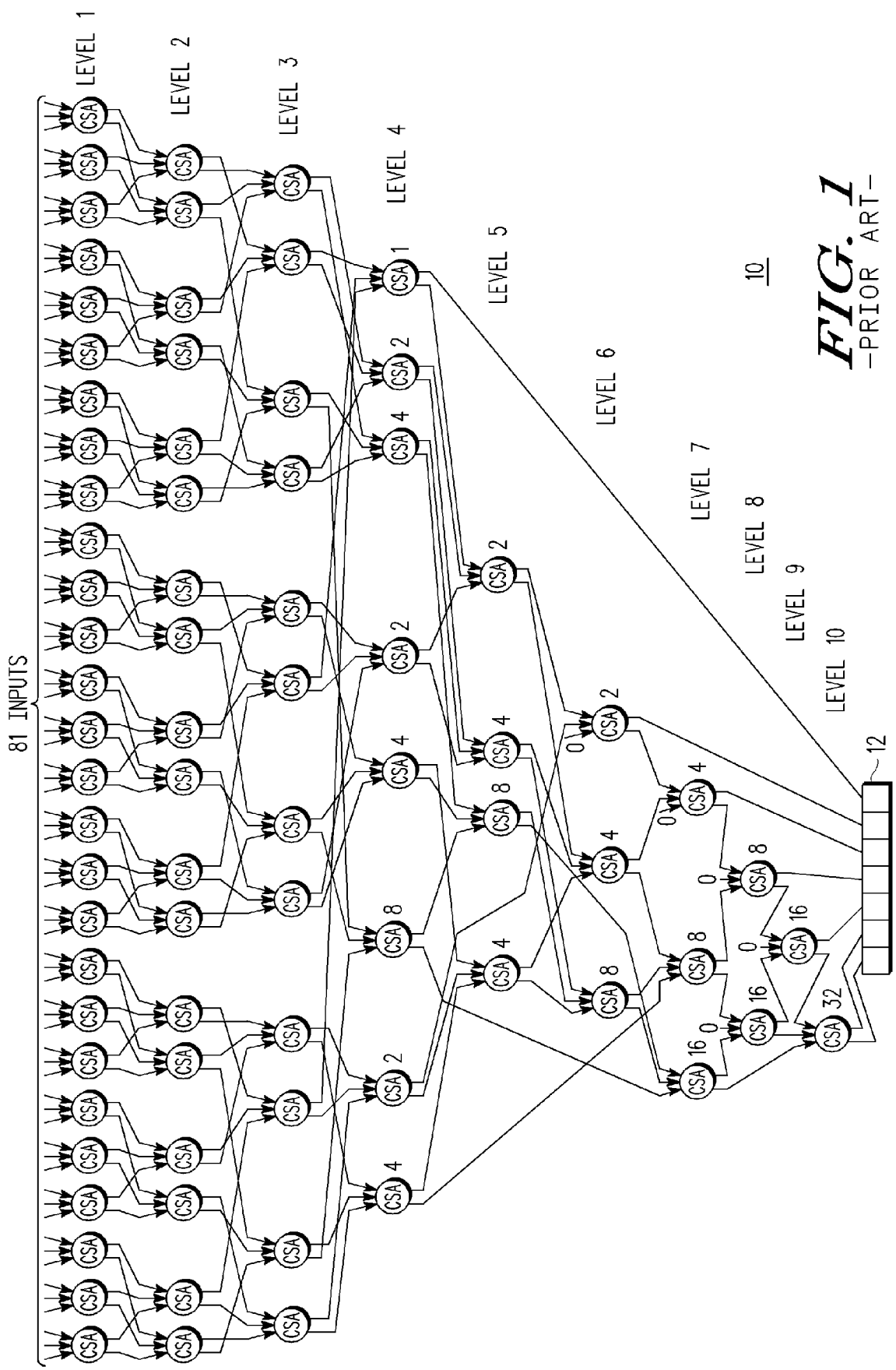
Figure 2:
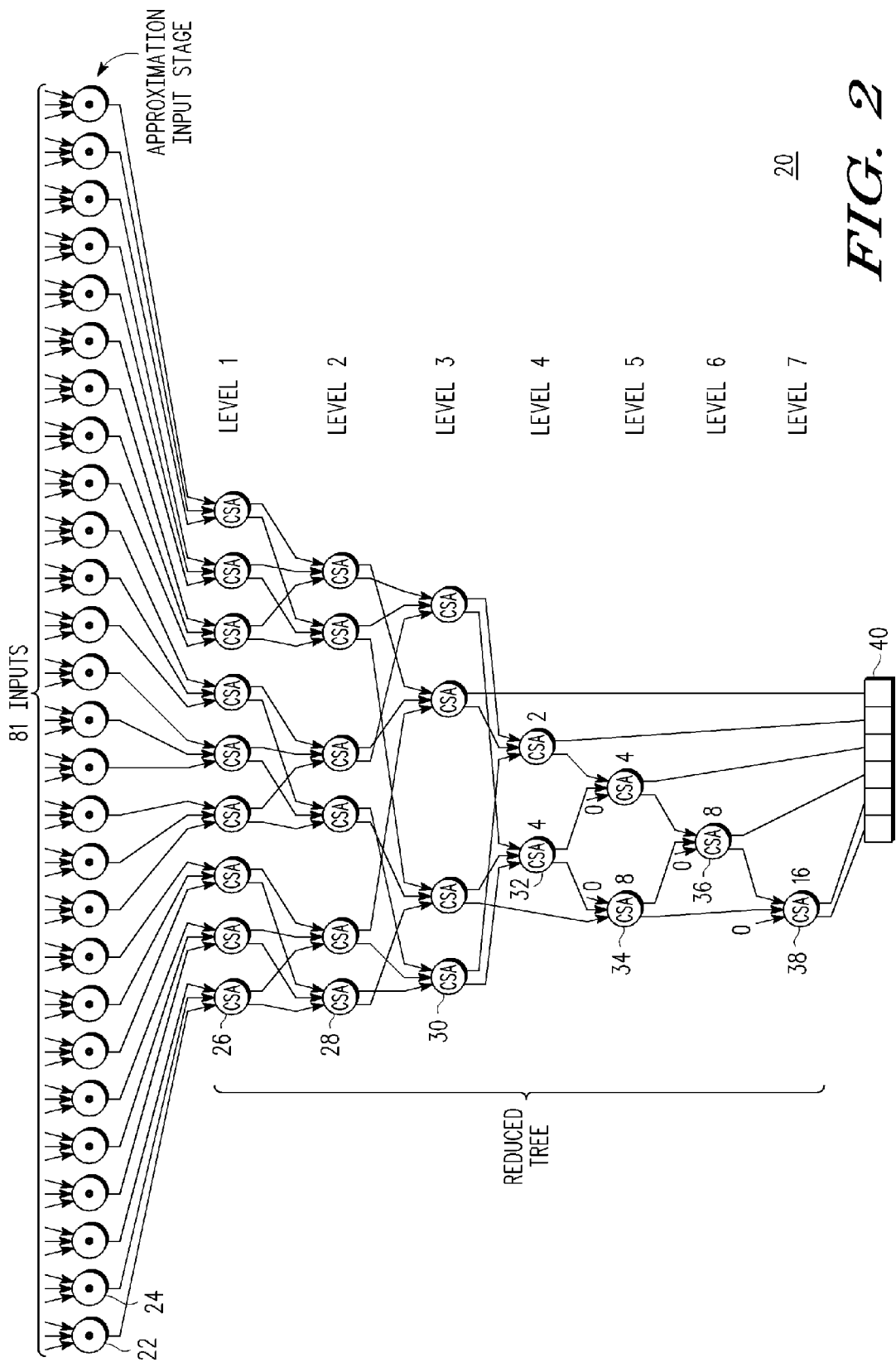
Figure 3:
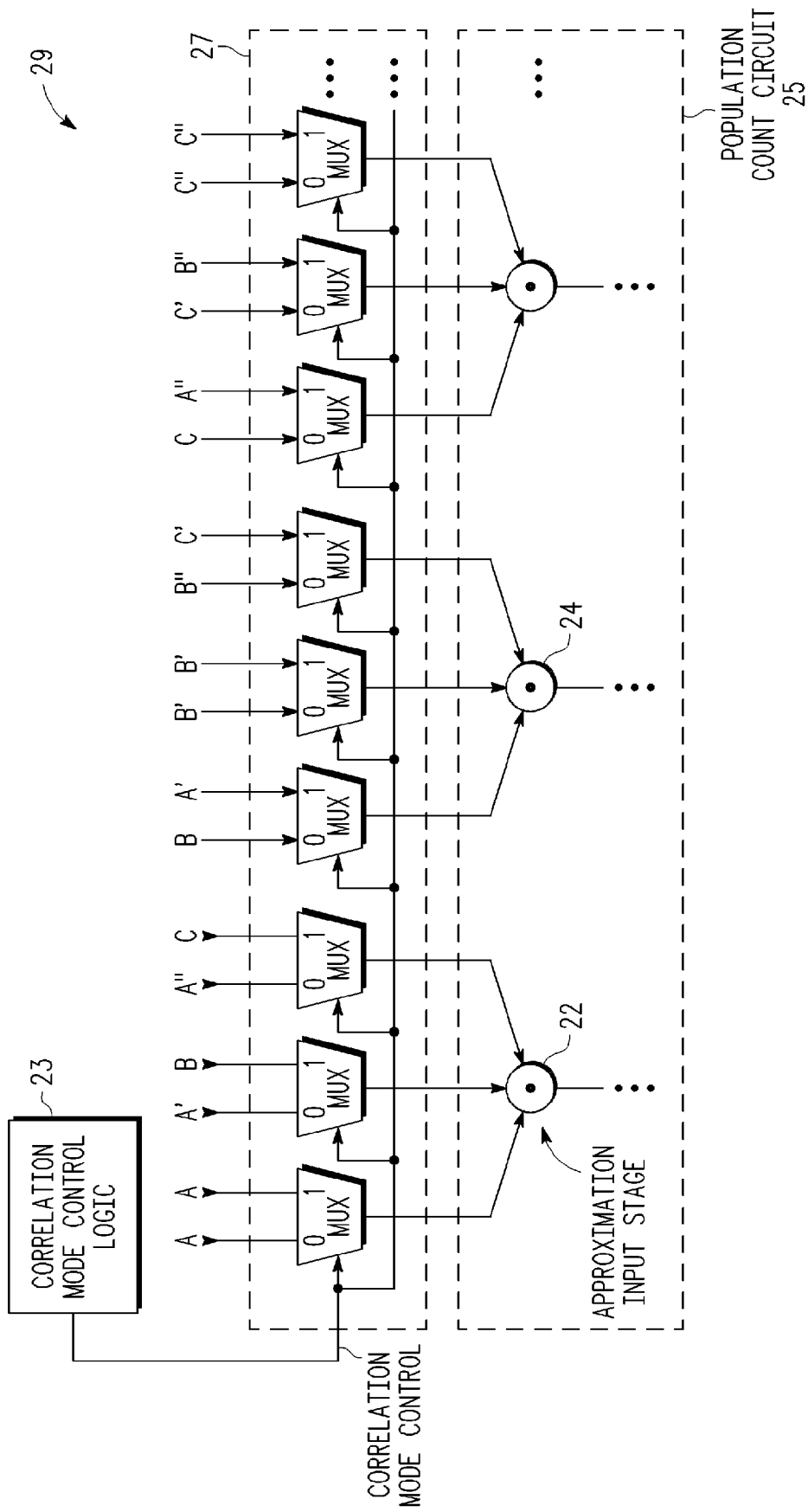
Figure 4:
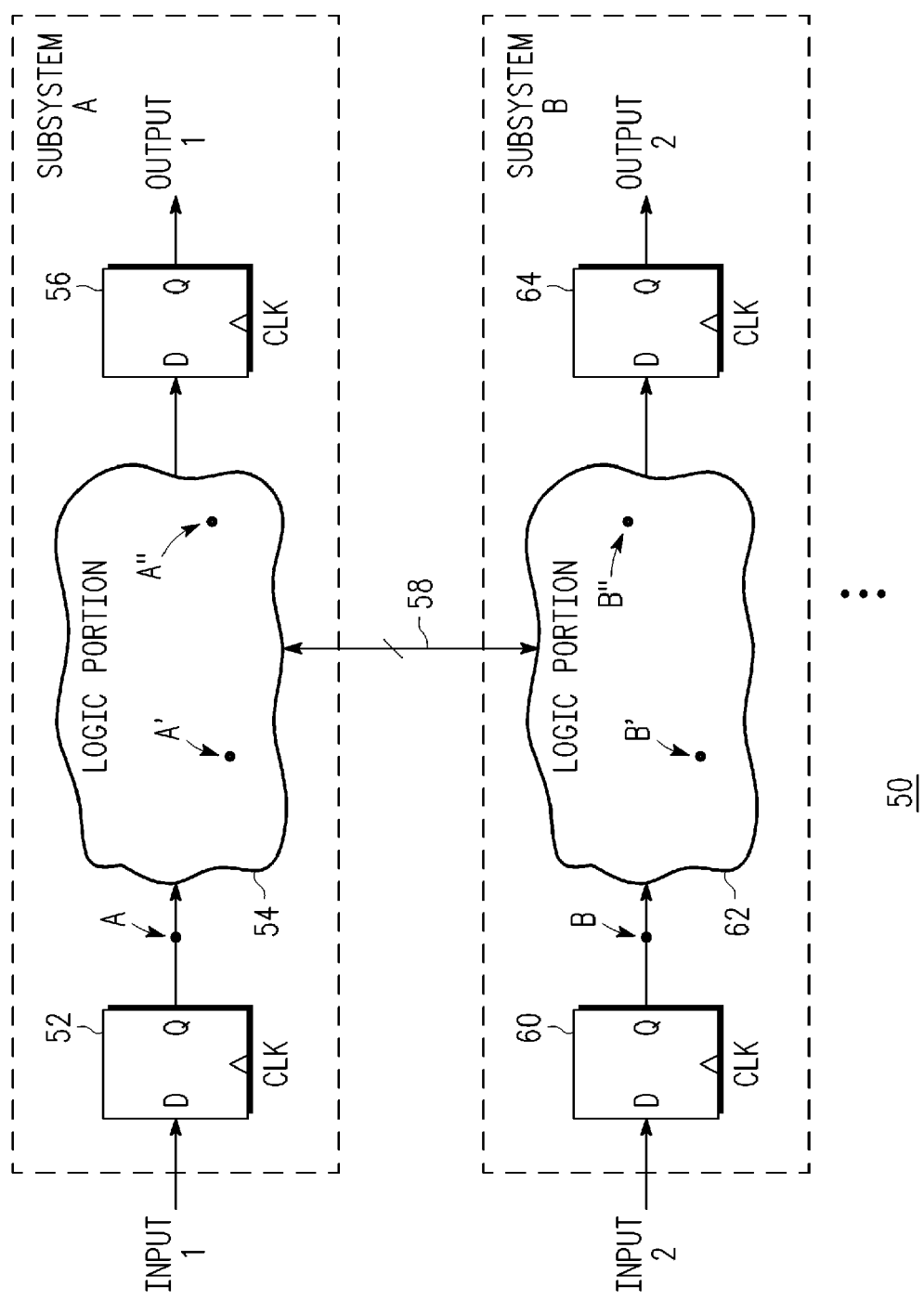

Illustrated in FIG. 1 is a logic-level diagram of a known population count circuit;

Illustrated in FIG. 2 is a logic-level diagram of a population count approximation circuit in accordance with one form of the present invention;

Illustrated in FIG. 3 is a logic-level diagram of a circuit for correlated inputs to a population count circuit in accordance with one form of the present invention;

Illustrated in FIG. 4 is a logic-level diagram of subsystems within an integrated circuit having correlated data values; and Illustrated in FIG. 5 is a flow chart of a method for processing correlated inputs to a population count circuit.

DETAILED DESCRIPTION

Illustrated in FIG. 1 is a known population count circuit 10. In the illustrated form a total of 81 input bits are shown. This number is arbitrarily chosen for illustration purposes only. The population count circuit 10 stores a data value in a register 12 that indicates how many logic "1" bit values exist among the 81 input bits. Within the population count circuit 10 are ten levels of three-input carry-save-adder ("CSA") circuits. Each carry-save-adder circuit provides two outputs. A right-hand output has a binary weighting of $2^0$ and a left-hand output has a binary weighting of $2^1$. Between the first level and second level of carry-save-adder circuits, the number of inputs has been reduced by a factor of three-to-two. A similar reduction in number of inputs occurs in each of the remaining levels 3, 4, 5, 6, 7, 8, 9 and 10. In some situations within levels 6, 7, 8 and 9 there are extra inputs for the carry-save-adder circuits. These inputs are permanently connected to a logic zero or ground value. In levels 4 through 10, each carry-save-adder has a binary weighting next to it. The value of the binary weighting represents the highest of the binary weighting of the inputs that the carry-save-adder receives. This weighting thus determines where the appropriate left output and right output of each carry-save-adder circuit is connected to in the next higher level of carry-save-adder circuits. In the illustrated form the population count circuit 10 implements a tree structure, although inverted from the traditional shape of a tree. Each successive level implements fewer carry-save-adder circuits due to the three input-to-two output structure of each carry-save-adder circuit. A carry-save-adder circuit is a well known adder circuit and may be implemented by any of several circuit implementations. Typical carry-save-adder circuits require multiple logic gates to implement and have a relatively large propagation delay.

In the operation of population count circuit 10, the addition of the 81 bit inputs with the weighting connections shown results in a value in register 12 that represents the total number of logic "1" bit values presented within the 81 bit inputs. Several issues are notable from the population count circuit 10. The seventy-nine carry-save-adder circuits that are required to be implemented consume a large amount of circuit area. Additionally, the amount of time required to propagate data bit values through ten levels of carry-save-adder circuits is significant. Numerous logic gate delays are required to pass before a count value is presented to register 12. Thus the population count circuit 10 is both larger and slower than desired.

Illustrated in FIG. 2 is a population count approximation circuit 20 in accordance with one form of the present invention. For purposes of comparison with FIG. 1, the same number of bits of input data is implemented as the conventional population count circuit 10. In one form each input data bit corresponds to a value present at a predetermined point or node within an integrated circuit. In this form the population count approximation circuit 20 functions to calculate an approximation of a count of bit values present at predetermined points within the integrated circuit. It can be readily seen that only seven levels of carry-save-adder circuits are required plus an approximation input stage. The approximation input stage is implemented as a plurality of predetermined logic gates, such as gate 22 and gate 24. Each of the logic gates is implemented with multiple inputs and a single bit output. In one form, each logic gate may be implemented as a NOR gate or as an OR gate. It should be understood that other logic gate functions which each provide a single output may be implemented. Each gate of the approximation input stage thus detects whether any of the three inputs is a bit value "1" and adjusts its output when a "1" is detected. Thus the input stage only approximates the total count of the number of "1" bit values. However, in many applications an approximation of the count value is sufficient rather than an exact count value. The outputs of the logic gates of the approximation input stage are sequentially routed to inputs of a plurality of carry-save-adder circuits of a Level 1 of carry-save-adder circuits. A carry-save-adder 26 is one of the 3-input: 2-output adders of the first level of carry-save-adders. The first level of carry-save-adder circuits may be modified carry-save-adder circuits which account for the logic polarity of the outputs of the approximation input stage. For example, when the approximation input stage is implemented with NOR logic gates, the first level of carry-save-adders may be implemented such that the inputs to these carry-save-adders are active low inputs. Conversely, if the approximation input stage is implemented with OR logic gates, the first level of carry-save-adders may be implemented as carry-save-adders which have active high inputs.

A second level of carry-save-adders, such as carry-save-adder 28, has inputs connected to predetermined outputs of the outputs of the first level of carry-save-adders. For example, for the two right-most carry-save-adders within level two, the inputs of the first carry-save-adder are connected to respective right-most outputs of the three right-most carry-save-adders of level one. The inputs of the second-to-right carry-save-adder in level two are connected to respective left-most outputs of the three right-most carry-save-adders of level one. A similar pattern exists for remaining pairs of carry-save-adders within level two.

Within level three of the carry-save-adders are four carry-save-adders including a carry-save-adder 30. The right-most carry-save-adder of level three receives three outputs from level two that are binarily weighted two. The second from the right carry-save-adder of level three receives three outputs from level two that are binarily weighted one and its binarily weighted one output is connected directly to a least significant bit value of an output register 40. The third from the right carry-save-adder within the third level receives outputs from level two that are binarily weighted four. Thus its right-most output will be binarily weighted four and its left-most output will be binarily weighted eight. The left-most carry-save-adder 30 receives outputs from level two that are binarily weighted two. Thus its right-most output will be binarily weighted two and its left-most output will be binarily weighted four.

Within level four of the carry-save-adders are two carry-save-adders including a carry-save-adder 32. Carry-save-adder 32 receives inputs from level three that are binarily weighted four. Also within level four is another carry-save-adder that receives inputs from level three that are binarily weighted two. A right-most output of the right-most carry-save-adder within level four is connected directly to the next-to-least significant bit within register 40. Within level five of the carry-save-adders are two carry-save-adders including a carry-save-adder 34. Carry-save-adder 34 receives inputs from level four that are binarily weighted eight. A right-most carry-save-adder within level five receives inputs from level four that are binarily weighted four. Thus a right-most output of the right-most carry-save-adder of level five is connected directly to the bit position of register 40 that is binarily weighted four. Level six contains a single carry-save-adder as does level seven. Carry-save-adder 36 is in level six and carry-save-adder 38 is in level seven. Carry-save-adder 36 receives inputs that are binarily weighted eighth. Carry-save-adder 38 receives inputs that are binarily weighted sixteen. Spare inputs of the carry-save-adders within population count approximation circuit 20 are connected to a logic zero value. Alternatively, these carry-save-adders could be implemented such that the unused input is eliminated, such as in a 2:2 carry-save-adder. Structurally, the population count approximation circuit 20 implements a reduced tree structure or reduction tree having significantly fewer carry-save-adders than conventional population count circuits. In the embodiment illustrated in FIG. 2, the same number of input values (81 input values) as are shown in population count circuit 10 of FIG. 1 are used in computing an approximate population count. However, in the population count approximation circuit 20, only twenty-five carry-save-adders are used as compared to seventy-nine carry-save-adders used in population count circuit 10 of FIG. 1. The number of levels of carry-save-adder circuits in the tree of the population count approximation circuit 20 is reduced from ten in FIG. 1 to seven in FIG. 2.

In operation, population count approximation circuit 20 performs a population count approximation by grouping multiple inputs within the approximation input stage to form a single output from the multiple inputs. Thus, the value stored in register 40 does not necessarily indicate an exact value of the number of logic "1" bits that existed in all of the original input bits. However, the value stored in register 40 will always accurately indicate if any of the multiple inputs contained a logic "1" bit. In addition, the population count approximation circuit 20 guarantees monotonic accuracy. A larger number of inputs containing a logic "1" bit will never cause a population count approximation value to be smaller than that provided when a smaller number of inputs contain a logic "1" bit, regardless of which inputs contain a logic "1" bit. For many applications, the approximation is sufficient rather than requiring an exact count value. For example, some applications require the detection of any set bits in a vector value. Other applications indicate a failure condition or unsafe operation condition when a low threshold of set bits are indicated. This condition is associated with a sparse vector of failures. For sparse vectors of inputs having a logic "1" value, the population count approximation circuit 20 computes a population count approximation which is very close to the correct value or even exact. The population count approximation circuit 20 thus minimizes the cost of accumulating a population count of failures in semiconductor circuits such as logic circuits and memories. The approximation value provided by the population count approximation circuit 20 results in a reduced carry-save-adder tree with lower cost and minimized computation delay, and can be used to perform a failure summation with an acceptable loss of accuracy.

Illustrated in FIG. 3 is a circuit 29 for correlated inputs to a population count circuit 25. The population count circuit 25 may be any of a variety of types of population count circuits. In one form population count circuit 25 has been illustrated having an approximation input stage such as illustrated in FIG. 2. It should be understood that population count circuits that are not approximation count circuits may be directly used as the population count circuit 25. The circuit 29 includes a plurality of selection circuits or multiplexors 27 that are abbreviated as "Mux". Each selection circuit or multiplexor has two inputs, a control input and a single output. A correlation mode control logic circuit 23 has an output that is connected to each control input of each of multiplexor of the plurality of multiplexors 27 for providing a correlation mode signal. In the illustrated form the correlation mode signal is a digital signal. When the correlation mode signal is a logic "0" the left input of each multiplexor is selected. When the correlation mode signal is a logic "1" the right input of each multiplexor is selected. In the illustrated form input signals labeled A, A', A", B, B', B", C, C' and C" are provided. The signals A, A' and A" are correlated with each other meaning that the value of one of the signals affects or influences the value of the other two, or all of the signals are affected by or influence another common signal. Similarly, signals B, B' and B" are correlated and signals C, C' and C" are correlated. The signals A, B and C are not correlated to each other. The outputs of each multiplexor are connected to a population count circuit 25. In the illustrated form a plurality of three-input logic gates, such as logic gate 22 and logic gate 24, is provided. Each of the logic gates receives an output from each of three different multiplexors and provides a single approximated output. In one form the remainder of the approximation circuitry for population count circuit 25 is as illustrated in FIG. 2 and therefore is not repeated in FIG. 3. Thus circuit 29 enables the grouping of correlated inputs in one mode of operation and the grouping of uncorrelated inputs in another mode of operation. An approximation function can therefore be specifically customized and based on either correlated data values or uncorrelated data values. Count values may differ between the approximation of correlated data and uncorrelated data. Therefore, different actions may be specified for each mode of operation.

With the input signal grouping illustrated in FIG. 3, when the correlation mode control signal has a logic "0" value, correlated inputs A, A' and A" are grouped into one single output of logic gate 22. Similarly, correlated inputs B, B' and B" are grouped into one input and correlated inputs C, C' and C" are grouped into one input. In contrast, when the correlation mode control signal has a logic "1" value, uncorrelated inputs A, B and C are grouped into one single input. Similarly, uncorrelated inputs A', B' and C' are grouped into one input and uncorrelated inputs A", B" and C" are grouped into one input. Thus the logic "0" value represents a correlated mode of operation and the logic "1" value represents an uncorrelated mode of operation.

Illustrated in FIG. 4 is a system 50 having at least a Subsystem A and a Subsystem B that are coupled by a multiple-bit communication interconnect 58. A first input value (Input 1) is connected to a data input, labeled D, of a flip-flop circuit 52. A data output, labeled Q, of flip-flop circuit 52 represents signal A of FIG. 3 and is connected to an input of a logic portion 54. Within the logic portion 54 are generated various signals or bit values including signal A' and signal A". Each of signals A, A' and A" are correlated because the value of signal A affects or influences the value of each of signal A' and signal A" since signal A is the input for logic portion 54. In the example, an output of logic portion 54 is connected to data input of a flip-flop circuit 56. An output of flip-flop circuit 56 provides an output labeled "Output 1".

Within the subsystem B a second input value (Input 2) is connected to a data input, labeled D, of a flip-flop circuit 60. A data output, labeled Q, of flip-flop circuit 60 represents signal B of FIG. 3 and is connected to an input of a logic portion 62. Within the logic portion 62 are generated various signals or bit values including signal B' and signal B". Each of signals B, B' and B" is correlated because the value of signal B affects or influences the value of each of signal B' and signal B" since signal B is the input for logic portion 62. In the example, an output of logic portion 62 is connected to data input of a flip-flop circuit 64. An output of flip-flop circuit 64 provides an output labeled "Output 2". Other data signal correlations exist within each of the subsystems but are not shown. It should be understood that additional subsystems are present within an integrated circuit. Also data correlations may exist between two or more subsystems.

In one form, the signals selected to form each set, or a subset of each set may be signals which are indicative of one or more error conditions within system 50. Monitoring of the number of error signals, or the relative magnitude of the number of error signals may be performed using both correlated and uncorrelated measurements to determine whether operation of system 50 is sufficiently correct to continue operation without modification, or whether one or more operating parameters of one or more subsystems of system 50 need to be modified in order to increase the effectiveness of the operation of system 50. These operating parameters may include, but are not limited to supply voltage, operating frequency, enablement of error correcting circuitry, reliance on redundancy or redundant computations, and the like. A confidence level of the relative magnitude of the error conditions within system 50 may be advantageously obtained by utilizing the flows contained within process 70 of FIG. 5.

Illustrated in FIG. 5 is a flow chart of a method for correlating inputs to a population count circuit. When the method starts a step 72 involves the defining of a plurality of data inputs. Each data input corresponds to a predetermined circuit node of an integrated circuit. In a step 74 a first set of data inputs are defined as a correlated set of data inputs (i.e. data bits). For example, the set of A, A' and A" is a correlated set of inputs. The first set of data inputs are inputs of the plurality of data inputs. In a step 76, a second set of data inputs of the plurality of data inputs is defined as an uncorrelated set of data inputs. For example, the set of A and B is a set of uncorrelated inputs. In a step 78 a correlation mode control signal is used to provide one of either: (1) the correlated set; or (2) the uncorrelated set. Whichever set is selected is used as circuit inputs to a population count circuit to obtain a first population count of a predetermined logic level. For example, a population count circuit provides a population count of the number of logic "one" bits contained in the selected set of input bits. In an alternative form a population count approximation circuit as described above may be used rather than a population count circuit. The exact circuit configuration of the population count circuit that is chosen may vary. In a step 80 the correlation mode control signal is used to provide another of the correlated set or the uncorrelated set as circuit inputs to the population count circuit. A second population count is obtained of the second selected set by counting all bits of a predetermined logic level or value (e.g. logic one or logic zero) contained within the second selected set.

From step 80 one of two alternative processes may be implemented. In a first process, a step 82 is performed wherein at least one of the first population count and the second population count are used to determine an operating parameter of at least a portion of the integrated circuit. Examples of the operating parameter may vary but may include parameters such as power supply voltage value, frequency of operation, transistor threshold voltage, voltage values such as voltage margins, etc. In a step 84 the operating parameter is selectively modified in response to the value of the count.

As an alternative to step 82, an alternate process may be implemented at the conclusion of step 80. In a step 86 the first population count is compared with the second population count. In other words the count value associated with the correlated data inputs is compared with the count value associated with the uncorrelated data inputs. In response to the comparison, a determination is made of a confidence level of the correlation. The confidence level is a determination of the level of certainty that the count value indicates multiple errors or the presence of multiple bits of the predetermined bit value in the value being counted. For example, if the correlated set count value is much higher than the uncorrelated set count value, an assumption may be made that the higher count value in the correlated set is attributable to a single bit value from which a number of other counted bits are correlated to. Based upon this confidence determination, a subsequent action such as modification of an integrated circuit operating parameter may or may not be taken.

By now it should be appreciated that there has been provided a population count approximation circuit that provides an approximate count value but not an exact count value. Examples of how this approximation count is sufficient have been given. As a result of the initial combination of multiple inputs into a single input via the use of a logic gate, a monotonic accuracy is assured when counting inputs. Significant size and timing savings are generated.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 2 and the discussion thereof describe an exemplary population count approximation circuit, this exemplary circuit is presented merely to provide a useful reference in discussing various aspects of the invention. Of course, the description of the population count approximation circuit has been simplified for purposes of discussion, and it is just one of many different types of appropriate circuits that may be used in accordance with the invention. For example, several types of combinational logic circuits having any number of multiple inputs may be used in the approximation input stage. Further, those skilled in the art will recognize that the boundaries between logic blocks are merely illustrative and that alternative embodiments may merge logic blocks or circuit elements or impose an alternate decomposition of functionality upon various logic blocks or circuit elements. Selection circuits other than a multiplexor circuit may be used.

In one form there is provided a circuit including a plurality of selection circuits. Each of the plurality of selection circuits has a first input, a second input, a control input, and an output, wherein each of the first inputs receives one of a plurality of correlated signals, each of the second inputs receives one of a plurality of uncorrelated signals, each of the control inputs receives a correlation mode control signal, and each of the outputs provides the one of the plurality of correlated signals or the one of the plurality of uncorrelated signals based on the correlation mode control signal. A population count circuit has a plurality of data inputs coupled to receive the outputs of the plurality of selection circuits. The population count circuit provides a population count for the plurality of data inputs. In one form the population count provided by the population count circuit is an accurate count of how many asserted signals are received by the plurality of data inputs from the outputs of the plurality of selection circuits. In another form the population count provided by the population count circuit is an approximate count of how many asserted signals are received by the plurality of data inputs from the outputs of the plurality of selection circuits. In another form when at least one asserted signal is received by the plurality of data inputs, the approximate count is greater than or equal to one and less than or equal to an actual count of how many asserted signals are received by the plurality of data inputs. In yet another form the population count circuit includes an approximation input stage having a plurality of logic circuits. Each logic circuit has at least two data inputs to receive at least two of the outputs of the selection circuits and provides a single bit output. Each logic circuit asserts its single bit output when at least one of its at least two data inputs is asserted. In one form each of the control inputs receives a same correlation mode control signal, and each of the outputs provides the one of the plurality of correlated signals or the one of the plurality of uncorrelated signals based on the same correlation mode control signal.

In another form there is provided a method for performing population counts. A plurality of data inputs is defined, wherein each data input corresponds to a predetermined circuit node of an integrated circuit. A first set of data inputs of the plurality of data inputs is defined as a correlated set of data inputs. A second set of data inputs of the plurality of data inputs is defined as an uncorrelated set of data inputs. A correlation mode control signal is used to provide one of the correlated set or the uncorrelated set as circuit inputs to a population count circuit to obtain a first population count. The correlation mode control signal is used to provide another one of the correlated set or the uncorrelated set as circuit inputs to the population count circuit to obtain a second population count. In one form the first population count is an accurate count of how many data inputs of the one of the correlated set or the uncorrelated set are asserted. The second population count is an accurate count of how many data inputs of the another one of the correlated set or the uncorrelated set are asserted. In another form the first population count is an approximate count of how many data inputs of the one of the correlated set or the uncorrelated set are asserted. The second population count is an approximate count of how many data inputs of the another one of the correlated set or the uncorrelated set are asserted. In yet another form when at least one data input of the one of the correlated set or the uncorrelated set is asserted, the first population count is greater than or equal to one and less than or equal to an accurate count of how many data inputs of the one of the correlated set or the uncorrelated set are asserted. When at least one data input of the another one of the correlated set or the uncorrelated set is asserted, the second population count is greater than or equal to one and less than or equal to an accurate count of how many data inputs of the another one of the correlated set or the uncorrelated set are asserted. In another form at least one of the first population count and the second population count are used to determine an operating parameter of at least a portion of the integrated circuit. In another form the operating parameter is selectively modified. In another form the first population count is compared with the second population count to determine a confidence level of a correlation of the correlated set.

In yet another form there is provided a circuit including a plurality of multiplexers. Each of the plurality of multiplexers has a first input, a second input, a control input, and an output. Each of the first inputs receives one of a plurality of correlated signals. Each of the second inputs receives one of a plurality of uncorrelated signals. Each of the control inputs receives a correlation mode control signal, and each of the outputs provides the one of the plurality of correlated signals or the one of the plurality of uncorrelated signals based on the correlation mode control signal. A population count circuit has a plurality of data inputs coupled to receive the outputs of the plurality of multiplexers. The population count circuit provides an approximate count of how many asserted signals are received by the plurality of data inputs from the outputs of the plurality of multiplexers. The population count circuit includes an approximation input stage having a plurality of logic circuits, each logic circuit having at least two data inputs to receive the outputs of at least two multiplexers of the plurality of multiplexers and provides a single bit output.

Each logic circuit asserts its single bit output when at least one of its at least two data inputs is asserted.

In another form the population count circuit further includes a carry-save-adder (CSA) tree receiving the single bit outputs of the plurality of logic circuits and provides the approximate count. In another form each of the plurality of logic circuits is a NOR gate. In one form when at least one asserted signal is received by the plurality of data inputs, the approximate count is greater than or equal to one and less than or equal to an accurate count of how many asserted signals are received by the plurality of data inputs from the outputs of the plurality of multiplexers. In another form the approximate count provides monotonic accuracy. In yet another form each of the control inputs receives a same correlation mode control signal, and each of the outputs provides the one of the plurality of correlated signals or the one of the plurality of uncorrelated signals based on the same correlation mode control signal.

Thus, it is to be understood that the circuits depicted herein are merely exemplary, and that in fact many other circuits can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, population count approximation circuit 10 is implemented in silicon as an integrated circuit. Other embodiments may include different types of semiconductor materials. Alternately, population count approximation circuit 10 may be implemented by software code representation of silicon or another semiconductor material.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Although the invention is described herein with reference to specific embodiments, various modifications and changes can be made without departing from the scope of the present invention as set forth in the claims below. For example, any type of combinational logic circuitry may be used to implement the single output logic gates. Various types of storage circuits may be used to implement the register storage function of register 40. Other storage devices in addition to a register may be used. Various carry-save-adder circuits may be used to implement a carry-save-add function. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A circuit comprising:
a plurality of selection circuits, each of the plurality of selection circuits having a first input, a second input, a control input, and an output, wherein each of the first inputs receives one of a plurality of correlated signals, each of the second inputs receives one of a plurality of uncorrelated signals, each of the control inputs receives a correlation, mode control signal, and each of the outputs provides the one of the plurality of correlated signals or the one of the plurality of uncorrelated signals based on the correlation mode control signal wherein signals are correlated signals when the value of one of the signals affects or influences the value of the other signals, or all of the signals are affected by or influenced by another common signal; and
a population count circuit having a plurality of data inputs respectively coupled to receive the outputs of the plurality of selection circuits, the population count circuit providing a population count for the plurality of data inputs.

2. The circuit of claim 1, wherein the population count provided by the population count circuit is an accurate count of how many asserted signals are received by the plurality of data inputs from the outputs of the plurality of selection circuits.

3. The circuit of claim 1, wherein the population count provided by the population count circuit is an approximate count of how many asserted signals are received by the plurality of data inputs from the outputs of the plurality of selection circuits.

4. The circuit of claim 3, wherein when at least one asserted signal is received by the plurality of data inputs, the approximate count is greater than or equal to one and less than or equal to an actual count of how many asserted signals are received by the plurality of data inputs.

5. The circuit of claim 3, wherein the population count circuit comprises an approximation input stage having a plurality of logic circuits, each logic circuit having at least two data inputs to receive at least two of the outputs of the plurality of selection circuits and providing a single bit output, and wherein each logic circuit asserts its single bit output when at least one of its at least two data inputs is asserted.

6. The circuit of claim 1, wherein each of the control inputs receives a same correlation mode control signal, and each of the outputs provides the one of the plurality of correlated signals or the one of the plurality of uncorrelated signals based on the same correlation mode control signal.

7. A method for performing population counts comprising:
defining a plurality of data inputs, wherein each data input corresponds to a predetermined circuit node of an integrated circuit;
defining a first set of data inputs of the plurality of data inputs as a correlated set of data inputs, wherein a set of data inputs is correlated when the value of a signal at one of the data inputs will affect or influence the value of signals at the other data inputs, or the signals at each data input of the set will be affected by or influenced by another signal at a common data input;
defining a second set of data inputs of the plurality of data inputs as an uncorrelated set of data inputs;
using a correlation mode control signal to provide one of the correlated set or the uncorrelated set as circuit inputs to a population count circuit to obtain a first population count; and
using the correlation mode control signal to provide another one of the correlated set of data inputs or the uncorrelated set of data inputs as circuit inputs to the population count circuit to obtain a second population count.

8. The method of claim 7, wherein the first population count is an accurate count of how many data inputs of the one of the correlated set or the uncorrelated set are asserted, and wherein the second population count is an accurate count of how many data inputs of the another one of the correlated set or the uncorrelated set are asserted.

9. The method of claim 7, wherein the first population count is an approximate count of how many data inputs of the one of the correlated set or the uncorrelated set are asserted, and wherein the second population count is an approximate count of how many data inputs of the another one of the correlated set or the uncorrelated set are asserted.

10. The method of claim 9, wherein when at least one data input of the one of the correlated set or the uncorrelated set is asserted, the first population count is greater than or equal to one and less than or equal to an accurate count of how many data inputs of the one of the correlated set or the uncorrelated set are asserted, and when at least one data input of the another one of the correlated set or the uncorrelated set is asserted, the second population count is greater than or equal to one and less than or equal to an accurate count of how many data inputs of the another one of the correlated set or the uncorrelated set are asserted.

11. The method of claim 7, further comprising:
using at least one of the first population count and the second population count to determine an operating parameter of at least a portion of the integrated circuit.

12. The method of claim 11, further comprising selectively modifying the operating parameter.

13. The method of claim 7, further comprising:
comparing the first population count with the second population count to determine a confidence level of a correlation of the correlated set.

14. A circuit comprising:
a plurality of multiplexers, each of the plurality of multiplexers having a first input, a second input, a control input, and an output, wherein each of the first inputs receives one of a plurality of correlated signals, each of the second inputs receives one of a plurality of uncorrelated signals, each of the control inputs receives a correlation mode control signal, and each of the outputs provides the one of the plurality of correlated signals or the one of the plurality of uncorrelated signals based on the correlation mode control signal, wherein signals are correlated signals when the value of one of the signals affects or influences the value of the other signals of the plurality of signals, or all of the signals are affected by or influenced by another common signal; and
a population count circuit having a plurality of data inputs coupled to receive the outputs of the plurality of multiplexers, the population count circuit providing an approximate count of how many asserted signals are received by the plurality of data inputs from the outputs of the plurality of multiplexers.

15. The circuit of claim 14, wherein the population count circuit comprises an approximation input stage having a plurality of logic circuits, each logic circuit having at least two data inputs to receive the outputs of at least two multiplexers of the plurality of multiplexers and providing a single bit output, and wherein each logic circuit asserts its single bit output when at least one of its at least two data inputs is asserted.

16. The circuit of claim 15, wherein the population count circuit further comprises a carry-save-adder (CSA) tree receiving the single bit outputs of the plurality of logic circuits and providing the approximate count.

17. The circuit of claim 15, wherein each of the plurality of logic circuits comprises a NOR gate.

18. The circuit of claim 14, wherein when at least one asserted signal is received by the plurality of data inputs, the approximate count is greater than or equal to one and less than or equal to an accurate count of how many asserted signals are received by the plurality of data inputs from the outputs of the plurality of multiplexers.

19. The circuit of claim 14, wherein the approximate count provides monotonic accuracy.

20. The circuit of claim 14, wherein each of the control inputs receives a same correlation mode control signal, and each of the outputs provides the one of the plurality of correlated signals or the one of the plurality of uncorrelated signals based on the same correlation mode control signal.

* * * * *